(12) United States Patent
Wang et al.

(10) Patent No.: US 7,955,207 B2
(45) Date of Patent: Jun. 7, 2011

(54) TORQUE CONVERTER WITH PLANETARY GEAR SET

(75) Inventors: Wei Wang, Irvine, CA (US); Jeffrey Hemphill, Copley, OH (US); Philip George, Wooster, OH (US); George Bailey, Wooster, OH (US); Christopher Shamie, Wadsworth, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 921 days.

(21) Appl. No.: 11/789,151

(22) Filed: Apr. 24, 2007

(65) Prior Publication Data

US 2007/0254769 A1 Nov. 1, 2007

Related U.S. Application Data

(60) Provisional application No. 60/795,147, filed on Apr. 26, 2006.

(51) Int. Cl.
*F16H 47/08* (2006.01)

(52) U.S. Cl. .............................. 475/36; 475/53; 475/59

(58) Field of Classification Search ............... 475/35, 475/36, 53, 59
See application file for complete search history.

(56) References Cited

U.S. PATENT DOCUMENTS

| | | | |
|---|---|---|---|
| 2,919,607 A | 1/1960 | Moore | |
| 2,995,956 A | 8/1961 | Moore | |
| 3,354,746 A * | 11/1967 | Paredes | 475/49 |
| 4,382,393 A * | 5/1983 | Bowen | 475/47 |
| 4,610,181 A | 9/1986 | Houley et al. | |
| 5,125,323 A | 6/1992 | Yonezawa | |
| 5,778,925 A | 7/1998 | Cooke | |
| 6,261,198 B1 | 7/2001 | Moon et al. | |
| 6,849,024 B2 | 2/2005 | Hayashi et al. | |
| 2008/0119316 A1 * | 5/2008 | Ordo | 475/59 |

FOREIGN PATENT DOCUMENTS

| | | |
|---|---|---|
| EP | 1009943 | 6/2000 |
| EP | 1203899 A2 | 5/2002 |
| GB | 2193766 A | 2/1988 |

\* cited by examiner

*Primary Examiner* — David D Le
*Assistant Examiner* — Derek D Knight
(74) *Attorney, Agent, or Firm* — Simpson & Simpson, PLLC

(57) ABSTRACT

The present invention broadly comprises a torque converter including a cover and a planetary gear set rotationally interfaced with a hydraulic circuit and arranged to modify torque received by the cover from an engine. In some aspects, the gear set includes first and second components rotationally secured to the cover and an impeller shell, respectively. In some aspects, the first and second components are a carrier and ring gear, respectively. In some aspects, the gear set further comprises third and fourth component rotationally connected to a turbine shell and the output hub, respectively. The third component is arranged to receive torque from a clutch or a hub connected to the clutch. In some aspects, the third and fourth components are a carrier and ring gear, respectively. The gear set includes a component rotationally fixed with respect to a torque converter axis, and in some aspects, a ratchet one-way stator clutch.

12 Claims, 2 Drawing Sheets

TORQUE CONVERTER WITH PLANETARY GEAR SET

CROSS-REFERENCE TO RELATED APPLICATIONS

This application claims the benefit under 35 U.S.C. §119 (e) of U.S. Provisional Application No. 60/795,147 filed Apr. 26, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter with an on-board planetary gear set to interface a motor and transmission with incompatible torque and speed characteristics. Specifically, the torque converter connects a high-torque, low speed engine with a low-torque, high speed transmission.

BACKGROUND OF THE INVENTION

For some vehicles, it may be desirable to use an engine and a transmission that have incompatible torque and speed characteristics. For example, the engine has a high-torque, low speed characteristic and the transmission has a low-torque, high speed characteristic. Unfortunately, if the engine and transmission are directly connected, the differences in characteristics result in unsatisfactory operation of the vehicle. If the engine and transmission are connected through a torque converter, the operation is still unsatisfactory. Thus, there is a long-felt need for a means of interfacing engines and transmissions with incompatible torque and speed characteristics.

BRIEF SUMMARY OF THE INVENTION

The present invention broadly comprises a torque converter including a cover arranged for connection to a drive unit and a planetary gear set rotationally interfaced with a hydraulic circuit for the torque converter and arranged to modify torque received by the cover from the drive unit. In some aspects, the gear set includes a first component rotationally connected to the cover and a second component rotationally connected to an impeller shell for the torque converter. In some aspects, the first component is a carrier and the second component is a ring gear. In some aspects, the first component is a ring gear and the second component is a carrier. In some aspects, the converter includes a torque converter clutch connected to the impeller shell.

In some aspects, the gear set includes a third component rotationally connected to a turbine shell for the torque converter and a fourth component rotationally connected to an output hub for the converter. The third component is arranged to receive torque from a torque converter clutch. In some aspects, the clutch and the third component are secured to a hub. In some aspects, the third component is a carrier and the fourth component is a ring gear. In some aspects, the third component is a ring gear and the fourth component is a carrier.

The gear set includes another component rotationally fixed with respect to a longitudinal axis for the torque converter. In some aspects, the component is a sun gear. In some aspects, the component is rotationally secured to a stator hub. In some aspects, the torque converter includes a ratchet one-way stator clutch.

The present invention also broadly comprises a torque converter including a cover and a planetary gear set. The gear set includes a ring gear, a carrier, and a sun gear. The carrier is rotationally secured to the cover, the ring gear is rotationally secured to an impeller shell for the torque converter, and the sun gear is rotationally secured to a stator hub in the torque converter. In some aspects, the torque converter includes a torque converter clutch connected to the impeller shell or the torque converter includes a ratchet one-way stator clutch.

The present invention further broadly comprises a torque converter including a turbine shell and a planetary gear set. The gear set includes a ring gear, a carrier, and a sun gear. The carrier is rotationally connected to the turbine shell, the ring gear is rotationally connected to an output hub in the torque converter, and the sun gear is rotationally secured to a stator hub in the torque converter. In some aspects, the torque converter includes a torque converter clutch and the carrier is arranged to receive torque from the torque converter clutch. In some aspects, the torque converter includes a hub rotationally connected to the torque converter clutch and the carrier is rotationally secured to the hub. In some aspects, the torque converter includes a ratchet one-way stator clutch.

It is a general object of the present invention to provide a means to interface a motor and transmission with incompatible torque and speed characteristics.

It is a further object of the present invention to provide a means for using a torque converter to interface a motor and transmission with incompatible torque and speed characteristics.

It is another object of the present invention to provide a means to connect a high-torque, low speed engine with a low-torque, high speed transmission.

It is yet another object of the present invention to provide a means to connect a high-torque, low speed transmission with a low-torque, high speed engine.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

As noted supra, engines and transmissions with mismatched power characteristics cannot be connected without some type of interface. For example, a high-torque, low speed engine cannot be connected to a low-torque, high speed transmission without some means of modifying the torque and speed of the engine to levels compatible with the transmission. A present invention torque converter accomplishes the interfacing of an engine and a transmission with mismatched power characteristics, for example, a high-torque, low speed engine with a low-torque, high speed transmission, through the use of a planetary gear set disposed within the torque converter and arranged to modify the torque provided by the engine. Alternately stated, a present invention torque converter is arranged to modify torque received by the converter, for example, by the cover of the converter, from a drive unit.

Figure 1:
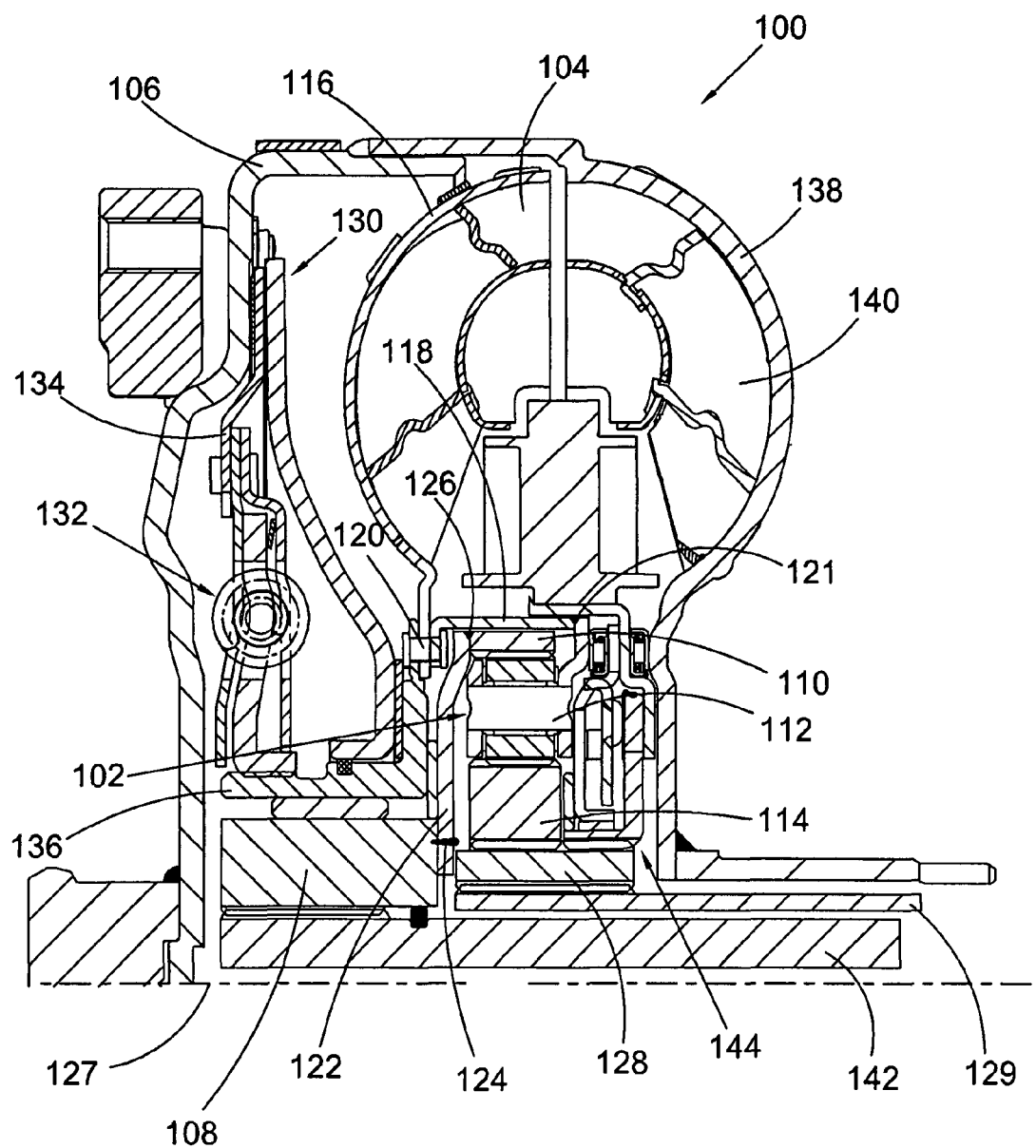
FIG. 1 is a partial cross-sectional view of a present invention torque converter with a planetary gear set downstream of a turbine in the torque converter; and, FIG. 2 is a partial cross-sectional view of a present invention torque converter with a planetary gear set upstream of an impeller in the torque converter.

FIG. 1 is a partial cross-sectional view of present invention torque converter 100 with planetary gear set 102 downstream of turbine 104 in the torque converter. That is, set 102 receives torque from turbine 104. Torque converter 100 includes cover 106 arranged to receive power from an engine, or drive unit, (not shown) to which the cover is connected. Gear set 102 is disposed within torque converter 100 and is rotationally interfaced with a hydraulic circuit for torque converter 100. By that we mean the gear set is variously connected, for example, rotationally connected to at least some of the components of the hydraulic circuit in the torque converter as further described infra. The gear set is arranged to accept the engine torque from the cover, to modify the engine torque and speed, and to transmit the modified engine torque to output hub 108. Gear set 102 includes three components, ring gear 110, carrier 112, and sun gear 114. Carrier 112 is rotationally connected to turbine shell 116. That is, carrier 112 is directly or indirectly connected to shell 116 so that carrier 112 rotates with the shell.

By rotationally connected, or secured, we mean that the carrier and the shell are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

In some aspects, plate 118 is used to indirectly connect the carrier and turbine shell 116. Shell 116, and carrier 112 and any intermediate components, such as plate 118, can be connected by any means known in the art, including, but not limited to rivet 120 and weld 121. Ring gear 110 is rotationally connected to hub 108. In some aspects, gear 110 is secured to plate 122, which in turn is secured to the hub. Gear 110, plate 122, and hub 108 can be secured by any means known in the art, including but not limited to welds 124 and 126. Sun gear 114 is grounded, that is, rotationally fixed with respect to longitudinal axis 127. For example, gear 114 is rotationally secured to stator hub 128. Hub 128 is rotationally secured to a stator shaft 129, which is rotationally fixed to a case for a transmission (not shown). In some aspects, the sun gear is axially moveable with respect to hub 128.

In some aspects, converter 100 includes torque converter clutch 130. It should be understood that clutch 130 can be any type of torque converter clutch known in the art. Carrier 112 is arranged to receive torque from torque converter clutch 130. In some aspects, clutch 130 includes dampening element 132. In general, clutch 130 operates as a typical torque converter clutch. In lock-up mode, plate 134 is engaged with cover 106 so that engine torque is transmitted to hub 136. Carrier 112 is rotationally secured to hub 136 by any means known in the art. In some aspects, rivet 120 secures shell 116, plate 118, and hub 136.

Torque converter 100 accomplishes the interfacing of a high-torque, low speed engine with a low-torque, high speed transmission as follows. During torque converter mode, engine torque is transmitted to cover 106, which is secured to impeller cover 138. Pump 140 and turbine 104 are hydraulically linked so that turbine 104 transmits modified engine torque through shell 116. That is, the engine torque is multiplied by the hydraulic circuit in the torque converter. The engine torque is transmitted to carrier 112, that is shell 116 and carrier 112 are rotating together at a first speed and carrying the modified engine torque. Ring gear 110 and carrier 112 are rotationally connected and the gear ratio of the ring gear and carrier causes an increase of the first speed and a reduction of the modified engine torque. Thus, ring gear 110 rotates faster than carrier 112 and carries less torque than carrier 112. Ring gear 110 is secured to output hub 108, which is rotationally secured to transmission input shaft 142. Therefore, shaft 142 rotates at a speed different than the turbine shell and carries a torque different than the turbine shell. The speed and torque of shaft 142 are compatible with a low-torque, high speed transmission.

During lock-up mode, clutch 130 is engaged so that engine torque is transmitted directly to hub 136 and hence, to carrier 112. The discussion of the operation of gear set 102 in torque converter mode is applicable to the operation of gear set 102 in lock-up mode. Thus, converter 100 executes the high-torque, low speed to low-torque, high speed conversion after the "normal" torque conversions and transmission operations in the torque converter.

In some aspects, torque converter 100 includes ratchet one-way clutch 144. In some aspects, clutch 144 is a ratchet one-way clutch including at least portions of an axially engaging and disengaging one-way clutch mechanism as shown in commonly assigned U.S. Provisional Patent Application No. 60/710,828, titled "STATOR HAVING AN AXIALLY ENGAGING AND DISENGAGING ONE-WAY CLUTCH MECHANISM FOR A TORQUE CONVERTER," inventors Brees et al., filed Aug. 24, 2005. Since ratchet clutch 144 has a relatively small axial width, the ratchet clutch advantageously provides a reduction in the overall axial width of torque converter 100.

Figure 2:
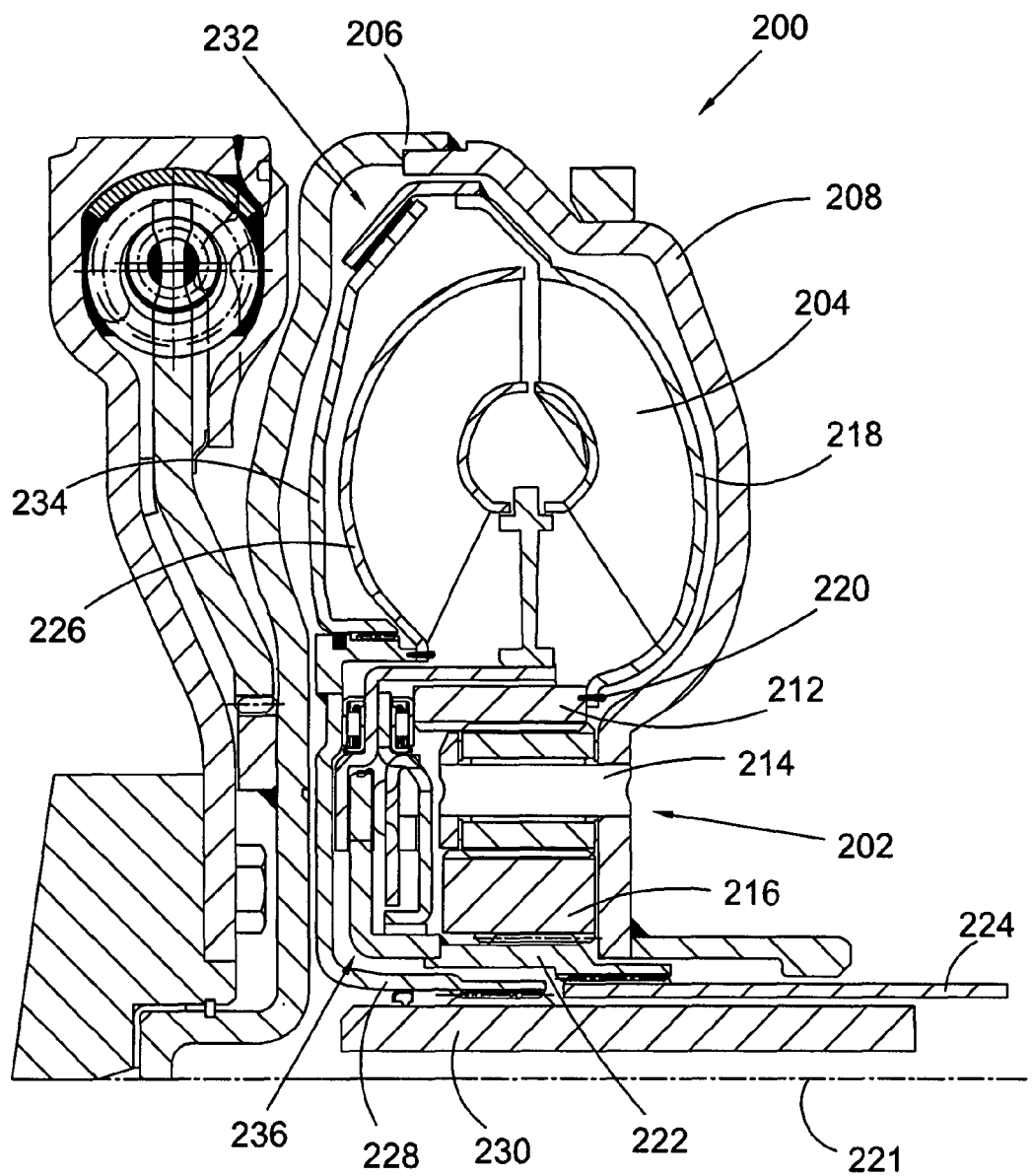

FIG. 2 is a partial cross-sectional view of present invention torque converter 200 with planetary gear set 202 upstream of an impeller 204 in the torque converter. Torque converter 200 includes cover 206 arranged to receive torque from an engine, or drive unit, (not shown) to which the cover is connected. Cover 208 is rotationally secured to cover 206. Gear set 202 is disposed within torque converter 200 and is arranged to accept the engine power from cover 208 and to transmit a modified engine torque to impeller 204. Gear set 202 includes three components, ring gear 212, carrier 214, and sun gear 216. Carrier 214 is rotationally connected to cover 208 by any means known in the art. In some aspects, the carrier and the cover are fixedly secured. Ring gear 212 is rotationally connected to impeller shell 218 by any means known in the art. In some aspects, gear 212 is fixedly secured to the shell by any means known in the art, including, but not limited to, weld 220.

Sun gear 216 is grounded, that is, rotationally fixed with respect to longitudinal axis 221. For example, gear 216 is rotationally secured to stator hub 222. Hub 222 is rotationally connected to stator shaft 224, which is rotationally fixed to a case for a transmission (not shown). In some aspects, the sun gear is axially moveable with respect to hub 222.

Torque converter 200 executes a high-torque, low speed to low-torque, high speed conversion before the "normal" torque conversions and transmission operations in the torque converter as follows. Engine torque at a first speed is transmitted to covers 206 and 208. Cover 208 transmits the engine torque to carrier 214, that is cover 208 and carrier 214 are rotating at the first speed and carrying the engine torque. Ring gear 212 and carrier 214 are connected and the gear ratio of the ring gear and carrier causes the ring gear to rotate at a second speed while carrying a second torque. The second speed is greater than the first speed and the second torque is less than the second torque. Ring gear 212 is secured to impeller shell 218. Once the impeller shell receives the second torque, the "normal" hydraulic operations associated with a pump and turbine in a torque converter take place. Turbine shell 226 is connected to output hub 228 and transmission input shaft 230. Therefore, the speed and torque carrier by shaft 230 are compatible with a low-torque, high speed transmission.

In some aspects, torque converter 200 includes torque converter clutch 232. Clutch 232 enables torque converter 200 to operate in a lock-up mode. For example, when clutch 232 is engaged, torque on shell 218 is transmitted to plate 234, which is rotationally secured to output hub 228.

In some aspects, torque converter 200 includes ratchet one-way clutch 236. In some aspects, clutch 236 is a ratchet one-way clutch including at least portions of an axially engaging and disengaging one-way clutch mechanism as shown in commonly assigned U.S. Provisional Patent Application No. 60/710,828, titled "STATOR HAVING AN AXIALLY ENGAGING AND DISENGAGING ONE-WAY CLUTCH MECHANISM FOR A TORQUE CONVERTER," inventors Brees et al., filed Aug. 24, 2005. Since ratchet clutch 236 has a relatively small axial width, the ratchet clutch advantageously provides a reduction in the overall axial width of torque converter 200.

As noted supra, gear set 202 causes impeller shell 218 to rotate at a greater rate than the rate at which engine torque on cover 208 would otherwise cause shell 218 to rotate. Therefore, for a same engine power input and desired torque converter output, torque converter 200 could be made smaller than torque converter 100. That is, an increase in input speed enables a decrease in torque converter size. However, there is still a specific heat requirement associated with the preceding engine power input and desired torque converter output, independent of the size of the converter used. Therefore, a smaller converter can be used for torque converter 200 if the smaller converter has the heat capacity to accommodate the heat requirements associated with the particular engine and transmission configuration involved. For example, a smaller torque converter can be used if the torque converter has "extra" heat capacity.

The following should be viewed in light of FIGS. 1 and 2. In FIGS. 1 and 2, a present invention torque converter includes a planetary gear set arranged to enable connection of a high-torque, low speed engine with a low-torque, high speed transmission. However, it should be understood that in some aspects (not shown), a present invention torque converter and planetary gear set are configured to enable connection of a low-torque, high speed engine with a high-torque, low speed transmission. For example, the connection configurations for the ring gears and planetary carriers in FIGS. 1 and 2 can be reversed. Specifically, in FIG. 1, ring gear 110 can be rotationally connected to turbine 104 and carrier 112 can be rotationally connected to hub 108.

A planetary gear set in a present invention torque converter is not limited to a particular size, capacity, or gear ratios. The size, capacity, and gear ratios can be selected as needed to accommodate the engine and transmission characteristics associated with each particular application.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
an output hub;
a turbine;
an impeller;
a hydraulic circuit including the turbine and the impeller;
a cover arranged for connection to a drive unit; and,
a planetary gear set:
including a ring gear connected to the hub;
including a carrier directly connected to the turbine or the cover at all times; and,
rotationally interfaced with the hydraulic circuit, wherein the carrier rotates with the cover or the turbine whenever the cover or the turbine rotates.

2. The torque converter of claim 1 wherein said planetary gear set further comprises a first component rotationally connected to said cover.

3. The torque converter of claim 2 wherein said first component comprises said carrier.

4. The torque converter of claim 1 further comprising a turbine shell; and wherein said planetary gear set further comprises a first component rotationally connected to said turbine shell.

5. The torque converter of claim 4 further comprising: a torque converter clutch; and wherein said first component is arranged to receive torque from said torque converter clutch.

6. The torque converter of claim 5 further comprising: a hub rotationally connected to said torque converter clutch; and wherein said first component is rotationally connected to said hub.

7. The torque converter of claim 4 wherein said first component comprises said carrier.

8. The torque converter of claim 4 wherein said first component comprises said ring gear.

9. The torque converter of claim 1 further comprising a longitudinal axis; and wherein said planetary gear set further comprises a third component rotationally fixed with respect to said axis.

10. The torque converter of claim 9 wherein said planetary gear set further comprises a sun gear and said third component comprises said sun gear.

11. The torque converter of claim 9 further comprising a stator hub; and wherein said third component is rotationally connected to said stator hub.

12. The torque converter of claim 1 further comprising a ratchet one-way stator clutch.

* * * * *